June 14, 1927.  J. ŠEDIVÁ  1,632,511

DEVICE FOR SEPARATING AND STRAINING LIQUIDS

Original Filed Jan. 12, 1923

Inventor:
Jarmila Šedivá

Patented June 14, 1927.

1,632,511

UNITED STATES PATENT OFFICE.

JARMILA ŠEDIVÁ, OF PRIBRAM, CZECHOSLOVAKIA.

DEVICE FOR SEPARATING AND STRAINING LIQUIDS.

Application filed January 12, 1923, Serial No. 612,241, and in Czechoslovakia January 13, 1922. Renewed May 12, 1927.

This invention relates to a device for separating and straining liquids of different density and of the kind comprising a funnel having a stem which projects into the funnel body so as to form, at the bottom of the latter, a space for the collection of sediment as well as of the heavier liquid, strainers being provided for purifying the liquid before it is discharged through the stem, the stem and the strainers being protected by a hood or shell arranged so as to feed the liquid circumferentially into the bottom space of the funnel.

According to the invention the strainers are held in a vertical position above the level of the stem, and a valve is provided which can be adjusted in the upper end of the stem by means of a screw spindle. The funnel space below the hood is divided by partitions into a plurality of concentric compartments which communicate with a discharge pipe.

By the vertical arrangement of the strainers, the latter can be placed right under the hood and near the center, i. e., in the least turbulent part of the funnel. They will thus be reached only by a small portion of the sediment, so that a clogging up of the passage is prevented and so that the separation process will be continuous and uniform.

Figure 1:
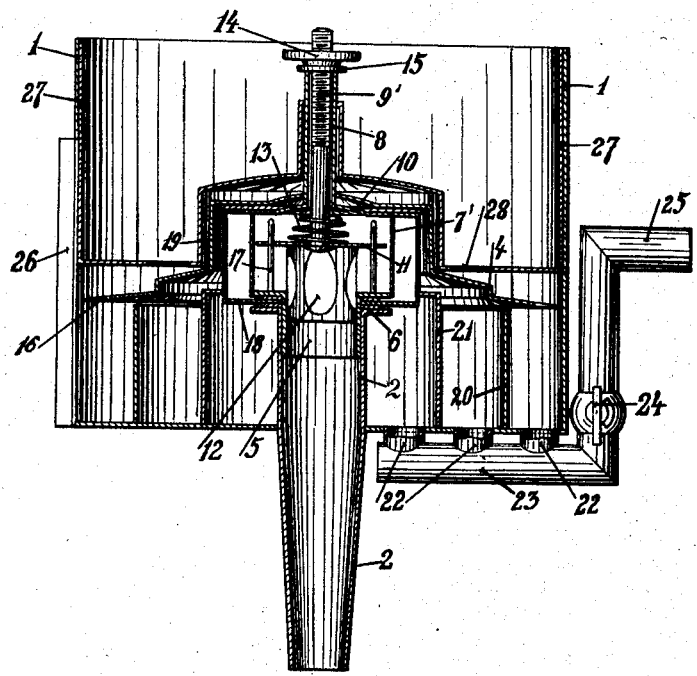
Figure 2:
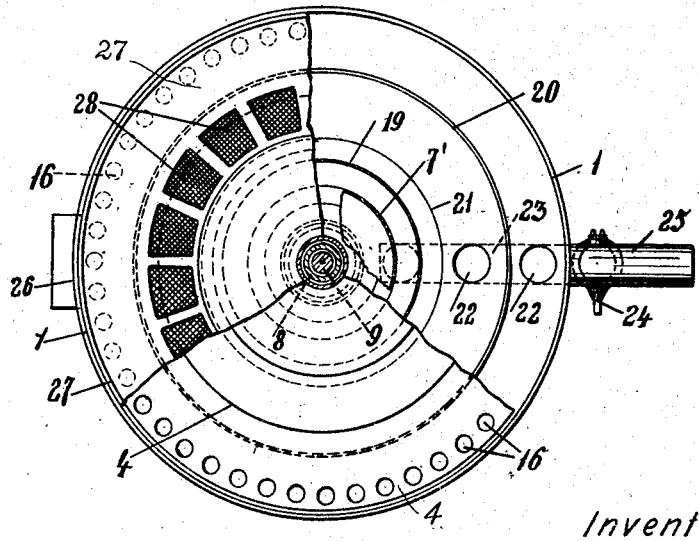

Fig. 1 of the accompanying drawings represents a vertical section of the funnel, and Fig. 2, a plan of the same, some parts being removed to show the interior.

The cylindrical funnel 1 is provided with a stem 2 which projects into the interior of the funnel so that a space is formed at the bottom of the latter for collecting solid particles and also, when two liquids of different density are introduced into the funnel, for retaining the heavier liquid. Fitted in the upper end of the stem 2 is a sleeve 5 which carries a cylinder 10 whose circumference is formed of sections covered with strainers 7'. The entrance to the sleeve 5 and to the stem 2 can be regulated by means of a valve composed of a cylinder 12 having oblong apertures. The valve is connected to a circular plate 11 which extends close to the strainers 7' and which is guided on upright bars 17 arranged within the cylinder 10. The latter is surmounted by a tube 8 within which is guided a screw-spindle 9'. This spindle holds the valve 12 and is supported by a milled nut 14 whose base 15 bears against the upper end of the tube 8. A spring 13 is introduced between the valve 12 and the cover of the cylinder 10 so as to urge the valve into the sleeve 5, the position of the valve being regulated by means of the nut 14. There is a second strainer 19 arranged outside the casing 10, this strainer being held by a ring 18 which is tightened by means of resilient washers to a flange 6 on the stem 2 and to the casing 10. The strainers are covered by a hood 4 which extends close to the funnel walls and which is formed near its circumference with apertures 16 through which the liquid can pass into the lower space of the funnel. This space is divided by concentric partitions 20 and 21 into several compartments which communicate with one another through apertures in the partitions. The latter approach the hood 4 so that only a comparatively narrow passage is formed between them and the hood. Thus the liquid will be compelled to pass quietly towards the strainers. A twice bent pipe 25, through which the heavier liquid can be drawn off, communicates through its lower horizontal branch 23 and through short lateral pipes 22 with the different compartments of the funnel. The pipe 25 contains a stop valve 24. On the outside of the funnel a gauge tube 26 is arranged through which the level of the denser liquid can be observed. A ring-shaped filling receptacle 27 is arranged in the upper part of the funnel. The bottom of this receptacle is formed with discharge apertures which are protected by strainers 28.

The action is as follows:

Liquid filled into the receptacle 27 will be separated in the latter from its coarser sediment and then fed on to the hood 4. From the latter, the liquid passes through the apertures 16 and over the edge of the hood into the outer funnel compartment whence it gradually flows into the other compartments and over the edges of the partitions towards the strainers 7' and 19. The partitions baffle the liquid and check the rush. Solid particles suspended in the liquid will be precipitated in the compartments in order of size, the heavier particles being collected in the outer, more disturbed compartments, and the lighter particles in the inner, calmer ones. The heavier liquid also settles at the bottom of the funnel and can be drawn off through the pipe 25. The level of the heavy liquid can be observed through the gauge 26 and can be regulated by an adjustment of the valve 24 so as to throttle the discharge. The light liquid rises under the hood 4 and passes through the strainers 7' and 19 and into the cylinder 10 and thence through the valve 12 into the sleeve 5 and into the discharge stem 2. The operation is continuous, the two liquids being separated and both discharged at the same time.

If only a small proportion of heavy liquid is contained in the mixture, the valve 24 can be closed during the operation and only opened as occasion demands for the discharge of the heavy liquid.

By a combination of several devices of this kind, several liquids in mixture can be separated, the lightest liquid being separated off in the first funnel and the others discharged together through the pipe 25 into the second funnel in which the next lighter liquid is divided off, and so on in succession.

I claim:—

1. In a device of the character described for separating and straining liquids, the combination with a funnel having a discharge stem which projects back into the funnel body, of strainers supported in a vertical position above the level of the stem, a protecting hood supported above the strainers, a valve arranged in the upper end of the stem so that it can be adjusted for regulating the inlet to the same, and an upright tube extending above said hood as a guide and support for the valve.

2. A device according to claim 1 wherein the strainers are cylindrical and concentric.

3. The structure claimed in claim 1 including a screw spindle connected to the valve and guided in the upright tube, a spring tending to close the valve, and a milled adjusting nut arranged on the spindle so as to support the valve in opposition to the spring by abutment against the upper end of the tube.

4. The structure claimed in claim 1 and circular partitions arranged below the hood so as to form a plurality of concentric overflow compartments.

5. The structure claimed in claim 1 including circular partitions arranged below the hood so as to form a plurality of concentric overflow compartments, a pipe communicating with said compartments for discharging their contents, and a stop valve in said pipe.

JARMILA ŠEDIVÁ.